United States Patent [19]
Takeuchi

[11] 3,921,243
[45] Nov. 25, 1975

[54] VEHICLE CLEANING APPARATUS
[75] Inventor: Shigeo Takeuchi, Nagoya, Japan
[73] Assignee: Takeuchi Tekko Kabushiki Kaisha, Nagoya, Japan
[22] Filed: Jan. 3, 1974
[21] Appl. No.: 412,434

[30] Foreign Application Priority Data
May 31, 1973 Japan............................. 48-60306

[52] U.S. Cl.............................. 15/21 D; 15/DIG. 2
[51] Int. Cl.²............................................. B60S 3/06
[58] Field of Search............. 15/DIG. 2, 21 D, 21 E, 15/53

[56] References Cited
UNITED STATES PATENTS

| | | | |
|---|---|---|---|
| 3,310,824 | 3/1967 | Beer | 15/21 D |
| 3,484,884 | 12/1969 | Fuhring et al. | 15/21 D |
| 3,506,995 | 4/1970 | Larson et al. | 15/21 D |
| 3,581,334 | 6/1971 | Follis | 15/21 D |
| 3,614,800 | 10/1971 | Takeuchi | 15/21 E |
| 3,720,972 | 3/1973 | Ennis | 15/21 D |
| 3,812,549 | 5/1974 | Hanna | 15/21 D |
| 3,818,530 | 6/1974 | Takeuchi | 15/21 D |

*Primary Examiner*—Edward L. Roberts
*Attorney, Agent, or Firm*—Waters, Schwartz & Nissen

[57] ABSTRACT

An apparatus having rotatable side brushes each supported by articulated arm means swingable about a vertical axis and normally biased to an extended position at right angles to the path of the vehicle so that the side brushes are displaceable automatically along the front, side and rear surfaces of the vehicle as it proceeds. The apparatus provides for a reduction in space for installation, increased cleaning efficiency, and reduced cost of fabrication and maintenance due to the fact that the need for any costly or moisture sensitive controlling elements, such as limit switches, is characteristically eliminated.

3 Claims, 11 Drawing Figures

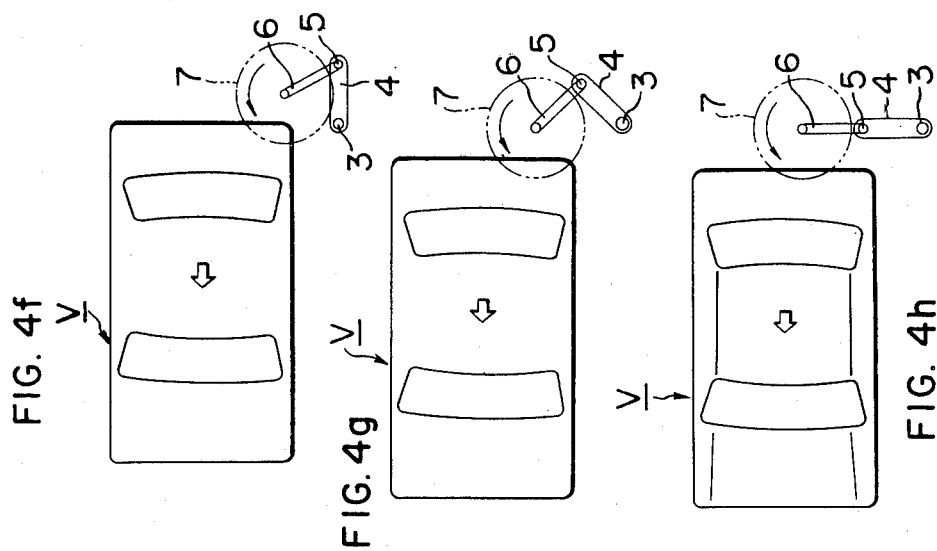
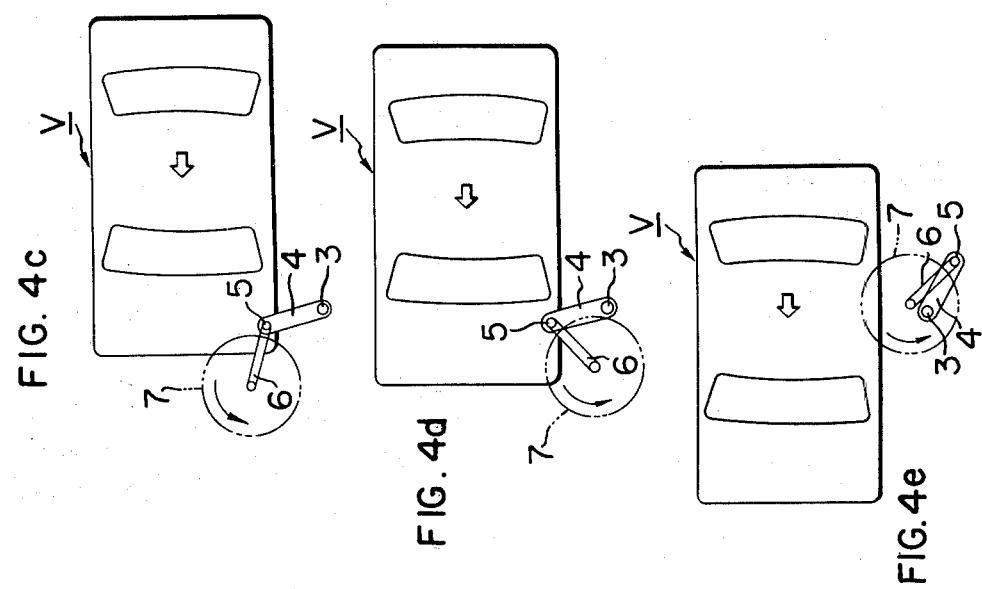
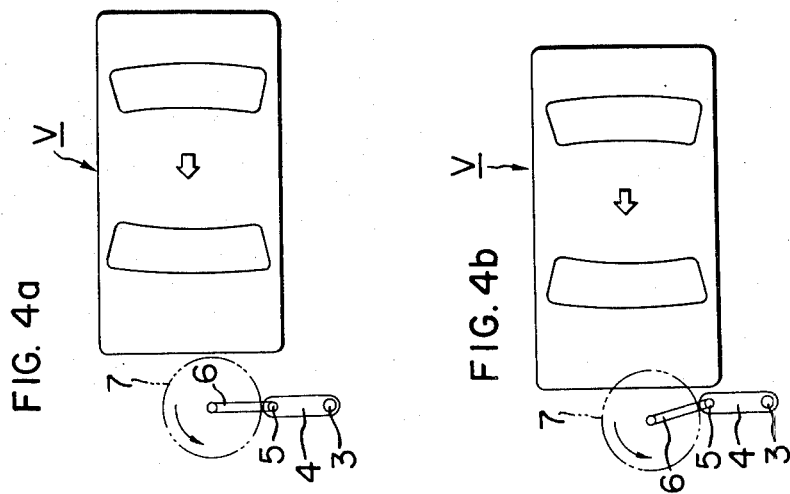

VEHICLE CLEANING APPARATUS

BACKGROUND OF THE INVENTION

This invention relates to vehicle cleaning apparatus of the type including at least one rotatable cylindrically shaped brush adapted to clean the front, side and rear surfaces of a vehicle such as an automobile.

One known form of brushing device employed in this type of vehicle cleaning apparatus includes a side brush supported on the stationary or movable portal frame structure of the apparatus by arm means swingable about a vertical axis so as to place the side brush in to engagement with the exterior of a vehicle to be cleaned. Another known form of brushing device includes a side brush which is secured to a vertical rotative shaft suspended from the portal frame structure for swinging movement and is displaceable along the front, side and rear surfaces of a vehicle for cleaning purposes.

With the former form of brushing device, however, either the portal frame or the vehicle must be moved back and forth in order to clean the front, side and rear surfaces of the vehicle whereby this results in requiring a substantially extended cleaning time. Moreover, this form of device is inadvantageous in that it requires the use of a substantial space for movement of the relatively long swing arm.

In the case of the latter form of brushing device, the relative speed between the vehicle being cleaned and the portal frame of the apparatus must be reduced to zero during cleaning of the front or rear surface of the vehicle and, accordingly, the cleaning time is extended to a substantial period. Further, in order to control the displacement of the vertical rotative shaft, a number of limit switches or other expensive and sensitive control elements must be employed which are liable to fail under conditions where a large amount of water is used, as in the case of vehicle cleaning apparatus.

SUMMARY OF THE INVENTION

The present invention provides a vehicle cleaning apparatus of the type described which is designed to overcome these difficulties previously encountered in this type of vehicle cleaning apparatus and which is simple in construction.

BRIEF DESCRIPTION OF THE DRAWINGS

The present invention will now be described in detail with reference to the accompanying drawings, which illustrate a preferred embodiment of the invention and in which:

FIGS. 4a, 4b, 4c, 4d, 4e, 4f, 4g and 4h are each respectively plan views diagrammatically illustrating the successive stages in the cleaning operation of the apparatus.

DESCRIPTION OF THE PREFERRED EMBODIMENT

Figure 1:
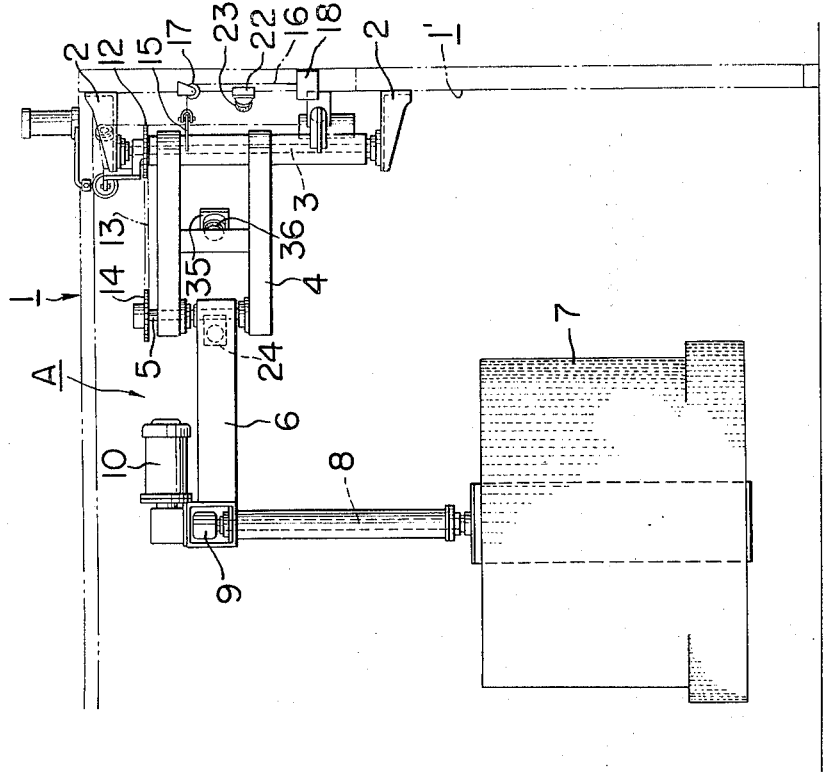
FIG. 1 is a fragmentary side elevational view of the vehicle cleaning apparatus embodying the present invention.
Figure 2:
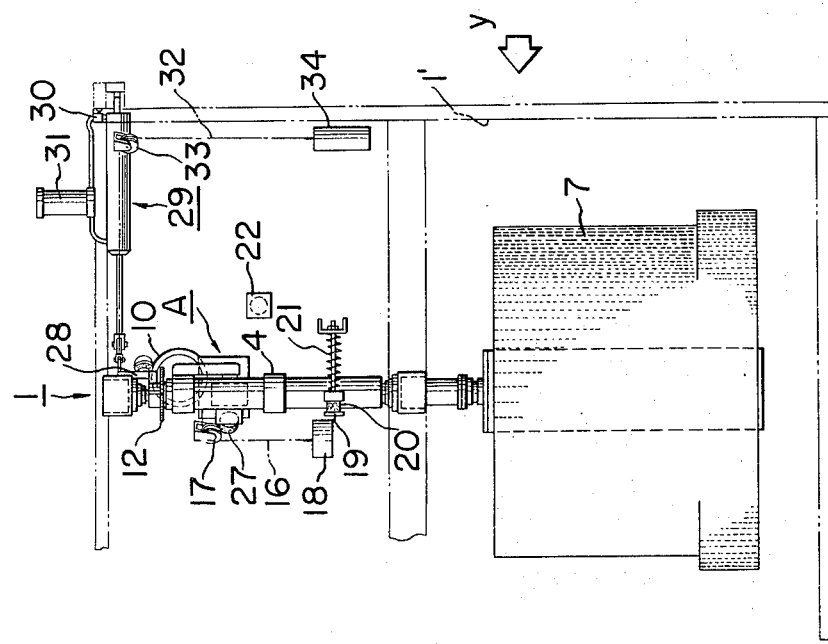
FIG. 2 is a rear view thereof.

Referring to the drawings, and first to FIGS. 1 and 2, the vehicle cleaning apparatus shown includes a portally shaped stationary frame structure 1 through which a vehicle to be cleaned is advanced, and a pair of side brushing devices A supported on the opposite side columns 1' of the frame structure. (As illustrated, only one of the two brushing devices A is shown for clarity.)

Each of the brushing devices A includes an upper and a lower bracket 2, 2 secured to the side column 1' in vertically spaced relation so as to jointly support a first vertical support shaft 3, on which a first swing arm 4, of framed shape, is swingably mounted at one of its end with a second vertical support shaft 5 rotatably mounted on the other end of the swing arm 4. A second swing arm 6 is firmly secured at one end to the second vertical support shaft 5, with a brush shaft 8 being mounted on the other end of the second swing arm 6, and extending vertically downward therefrom so as to carry a generally cylindrical side brush 7. The brush shaft 8 is connected at the top by coupling means 9 with the output shaft of a drive motor 10, which is mounted on the second swing arm 6.

A first chain sprocket wheel 12 is rotatably mounted on the top end of the first vertical support shaft 3 by means of a ball bearing 11 (see FIG. 3), and a second chain sprocket wheel 14 is firmly secured to the top end of the second vertical support shaft 5 with an endless chain belt 13 being entrained about the two sprocket wheels 12 and 14 so that, as the second swing arm 6 is turned with the second vertical support shaft 5, the first sprocket wheel 12 is driven to turn concurrently with the second sprocket wheel 14 through the medium of chain belt 13.

Laterally extending from the basal or pivoted portion of the frame-shaped first swing arm 4 is a projection 15, to the tip end of which there is secured a cable 16. The cable 16 is entrained about a pulley 17 which is journaled on the stationary frame 1 of the apparatus and, extending downwardly, carries a counterweight 18 at the bottom end thereof. As will be readily understood, the counterweight 18 serves the purpose of biasing the first swing arm 4 to its normal position, shown in FIG. 3, in which the arm 4 extends substantially at right angles to the inside surface of the adjacent side column 1' of the portal frame structure 1. Also secured to the basal portion of the first swing arm 4 is a stop member 19 which carries a rubber cushioning piece 20 at its extreme end for co-operation with a cushioning spring 21 provided on the column 1'. It will be understood that, when the first swing arm 4 is swung in the direction toward its normal position, the stop member 19 is carried so as to place the rubber cushion 20 into resilient engagement with the cushioning spring 21 to thereby resiliently hold the first swing arm 4 in its normal position. A further stop means 22 is provided on the frame column 1' in a position close to the cushioning spring 21, and includes a cushioning rubber piece 23 which is engageable with one of the lateral sides of the first swing arm 4 so as to define the maximum extent by which the arm 4 may be swung clockwise, as viewed in FIG. 3.

Figure 3:
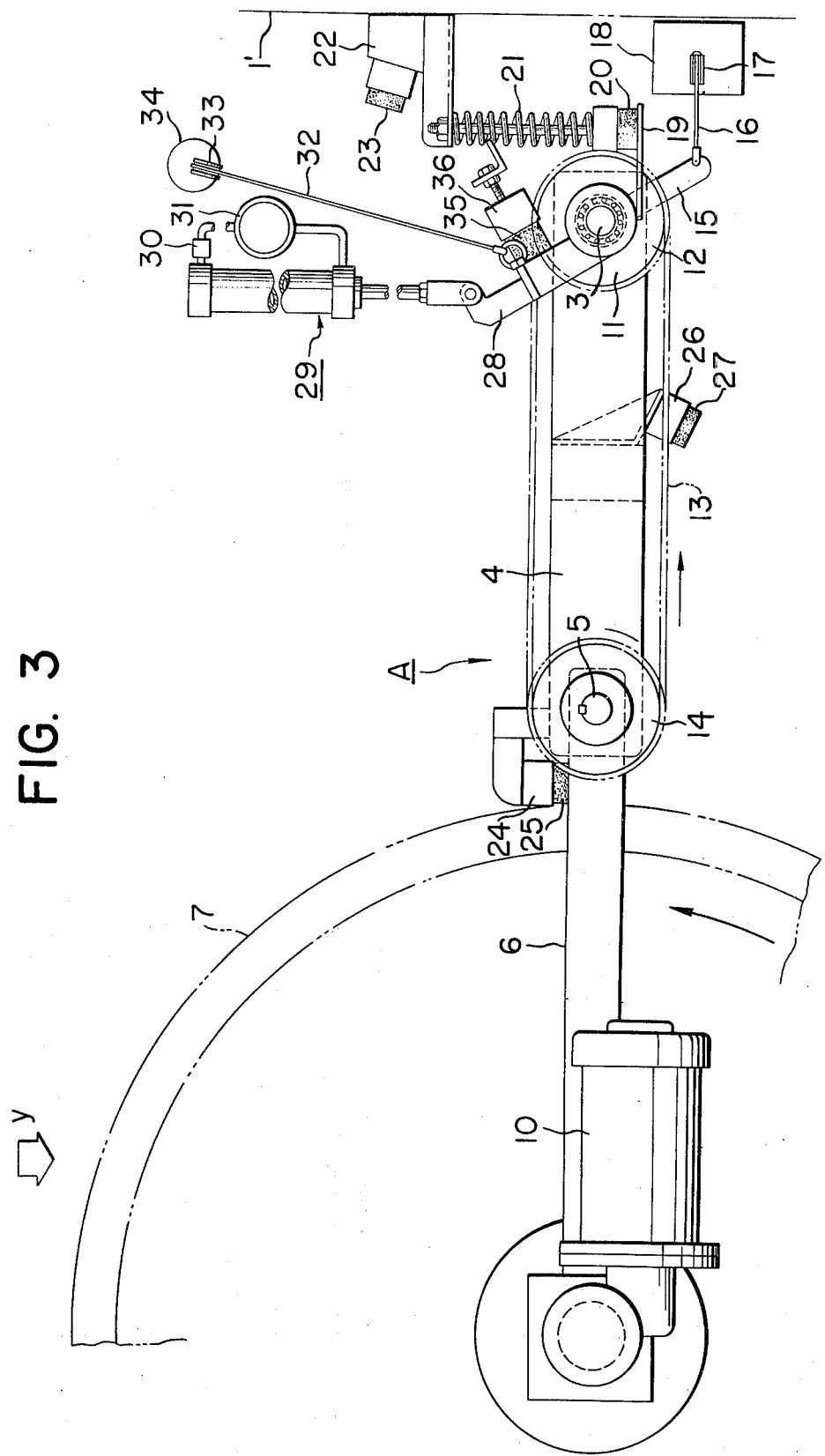
FIG. 3 is an enlarged plan view showing the essential parts of the apparatus.

Also secured to the first swing arm 4 at its distal end and intermediate its ends, respectively, are stop means 24 and 26 which include cushioning rubber pieces 25 and 27, respectively. One of the stop means, 24, is engageable with the second swing arm 6 on one side thereof, as shown in FIG. 3, when the arm 6 is swung to its normal position aligning with the first swing arm 4, and thus defines the normal position of the second swing arm 6 relative to the first swing arm 4. The other stop means 26 is engageable with the other side of the second swing arm 6 when the latter is swung in the opposite direction relative to the first swing arm 4 so as to define the maximum extent of such swing movement of the second swing arm 6.

As shown in FIGS. 1 and 3, the first sprocket wheel 12, which is freely rotatable relative to the first vertical support shaft 3 and first swing arm 4, is formed at the top with a laterally extending arm 28 to the extremity of which there is connected a uni-directional oil damper unit 29. The damper unit 29 is extensible in order to allow the first sprocket wheel 12 to turn slowly in a counterclockwise direction, as viewed in FIG. 3, and retractable so as to allow the wheel 12 to turn quickly in a clockwise direction. A cable 32 is secured at one end to the arm 28 and entrained about a pulley 33 to thereby suspend a counterweight 34 which is secured to the other end of the cable. As will be readily understood, the counterweight 34 serves, under gravity and through the medium of cable 32, to turn the wheel arm 28 clockwise, as viewed in FIG. 3, until a rubber cushion 35 provided on the wheel arm 28 is placed into engagement with a stop 36 when the second swing arm 6 is restored to its normal position, shown in FIG. 3.

In the drawings, reference numeral 30 indicates speed control means for the damper unit 29; and 31 indicates an oil reservoir. In FIGS. 2 and 3, the direction in which a vehicle to be cleaned is advanced is indicated by an arrow y.

Description will now be made of the manner in which the vehicle cleaning apparatus of the present invention operates in order to clean the exterior of the vehicle having particular reference to FIGS. 4a, 4b, 4c, 4d, 4e, 4f, 4g and 4h.

Initially, the motor 10 is energized in order to rotate the side brush 7 in a counterclockwise direction as indicated by the arrow, and then a vehicle V which is to be cleaned is advanced into the stationary portal frame structure, as indicated by the arrow in FIG. 4a, and the front surface of the vehicle V comes into engagement with the side brush 7, as shown in FIG. 4b, so as to push the latter forwardly. As a result, the second swing arm 6, from which the side brush 7 is suspended and which is associated, as described hereinbefore, with the damper unit 29 through the second vertical support shaft 5, second sprocket wheel 14, chain belt 13 and first sprocket wheel 12 and with the counterweight 34 through the cable 32, is swung counterclockwise slowly against the bias of the counterweight 34, causing the damper unit 29 to extend. As the vehicle V continues to advance, the second swing arm 6 is slowly swung further, as shown in FIG. 4c, the side brush 7 being displaced sidewise of the vehicle while keeping contact therewith to clean the front of the vehicle. Simultaneously with this sequence, the first swing arm 4 is swung slightly forward, as shown, in reaction to the frictional engagement of the side brush 7 with the vehicle front.

As the vehicle is advanced further, the side brush 7 is displaced around the corner of the vehicle V against its side, as shown in FIG. 4d, causing the second swing arm 6 to swing further at increased speed to a position at an angle of less than 90° to the plane of the first swing arm 4, which in turn is quickly swung clockwise in reaction to the frictional engagement of the side brush 7 with the vehicle side. In this manner, the first and second swing arms 4 and 6 are folded upon each other, as shown in FIG. 4e, enabling the side brush 7 to clean the side of the vehicle V with continued advancing movement thereof.

Subsequently, as the side brush 7 reaches the rear portion of the vehicle V, as shown in FIG. 4f, the first and second swing arms 4 and 6, which are interlocked by the chain belting 13 entrained about sprocket wheels 12 and 14, are allowed to swing back under the effect of frictional engagement of the rotating side brush 7 with the vehicle V and the gravitational weight of counterweight 18, as shown in FIG. 4g, thus enabling the side brush 7 to follow the advancing vehicle so as to effectively clean the rear surface thereof.

Finally, when the first and second swing arms 4 and 6 have swung to thereby restore their normal, extended position, as shown in FIG. 4h, the vehicle V leaves the side brush 7 behind, and with its front, side and rear surfaces having been completely cleaned.

Summarizing, the vehicle cleaning apparatus of the present invention includes foldable arm means including first and second mutually articulated swing arms 4 and 6 adapted to support a side brush 7 in such a manner so that during operation, the side brush 7 is displaced continuously about a vehicle while being advanced along the front, side and rear surfaces thereof in reaction to the frictional engagement of the rotating side brush 7 with the vehicle surfaces and, in this manner, these vehicle surfaces can be cleaned successively in one cycle of operation without requiring any interruption of the advancing movement of the vehicle, and hence at a substantial reduction in cleaning time. Particularly, for the final stage of operation cycle at which the rear surface of the vehicle is cleaned, the first and second swing arms 4 and 6 are so arranged as to swing back automatically into their normal, extended position, enabling the side brush 7 to follow the rear surface of the vehicle being advanced for carrying out an effective cleaning operation thereon and eliminating any danger that the rear surface of the vehicle are not cleaned to the same degree as the front and side surfaces thereof.

The vehicle cleaning apparatus of the present invention is also advantageous in that it is substantially free from trouble during operation thereof, and can be fabricated at a reduced cost since it does not need any costly or moisture-sensitive elements, such as limit switches, for controlling the displacement of the side brush.

What is claimed is:

1. A vehicle cleaning apparatus comprising: a frame structure portally shaped to allow passage therethrough of a vehicle to be cleaned, a first swing arm swingably mounted on a first vertical support shaft supported on each of the two side columns of said frame structure, a second swing arm firmly secured at one end to a second vertical support shaft rotatably carried by said first support arm for swinging movement about the axis of said second support shaft relative to said first swing arm, a rotatable cylindrically shaped side brush suspended vertically from the other end of said second swing arm, motor means for rotating said side brush, a first sprocket wheel rotatably mounted on said first support shaft, a second sprocket wheel fixed to said second support shaft, an endless chain belt entrained around said sprocket wheels, means for biasing said first and second swing arms into an extended position substantially at right angles to the path of the vehicle, and means connected to said first sprocket wheel for damping or slowing the turning of said first sprocket wheel in one direction while allowing it to turn freely in the other direction.

2. A vehicle cleaning apparatus according to claim 1, comprising a pair of side brushes respectively disposed on the opposite sides of the vehicle path and being rotated in opposite directions relative to each other.

3. A vehicle cleaning apparatus according to claim 1, said biasing means comprising a weight, and a cable connecting said weight to said first sprocket wheel.

* * * * *